H. W. LEONARD.
ELECTRIC CONTROL SYSTEM.
APPLICATION FILED OCT. 2, 1909. RENEWED SEPT. 9, 1912.

1,043,778.

Patented Nov. 5, 1912.

2 SHEETS—SHEET 1.

Witnesses
A. K. Schneider
Geo. N. Kerr

Inventor
H. Ward Leonard
By his Attorneys
Edwards, Sager & Wooster.

H. W. LEONARD.
ELECTRIC CONTROL SYSTEM.
APPLICATION FILED OCT. 2, 1909. RENEWED SEPT. 9, 1912.

1,043,778.

Patented Nov. 5, 1912.

2 SHEETS—SHEET 2.

Witnesses
Arthur A. Roe
A. K. Schneider

A. Ward Leonard Inventor
By Attorneys
Edwards & Sager

UNITED STATES PATENT OFFICE.

HARRY WARD LEONARD, OF BRONXVILLE, NEW YORK.

ELECTRIC CONTROL SYSTEM.

1,043,778. Specification of Letters Patent. Patented Nov. 5, 1912.

Application filed October 2, 1909, Serial No. 520,669. Renewed September 9, 1912. Serial No. 719,445.

*To all whom it may concern:*

Be it known that I, HARRY WARD LEONARD, a citizen of the United States, residing at Bronxville, in the county of Westchester and State of New York, have invented certain new and useful Improvements in Electric Control Systems, of which the following is a full, clear, and exact specification.

My invention relates to a system of electric control comprising the generation and utilization of electric energy and the control of apparatus so as to produce the desired change in its relationship.

My invention is particularly well adapted to the operation of electrically propelled vehicles wherein a plurality of motors act upon a common load, for example, as in a locomotive, or vehicles moving in water or air.

Among the objects of my invention may be mentioned the reduction in first cost of the required apparatus, the obtaining of high efficiency under all conditions of operation, the securing of maximum torque during starting or during low speeds when ascending a grade or rounding curves, and securing high speed with reduced torque on a level. I also secure a smooth and gradual control of the speed and torque in an efficient manner.

My invention also comprises automatically moved electrically controlled switches for effecting the desired relationship of the apparatus, and a master controller for controlling the operation of such switches and other control of the apparatus.

Although my invention is capable of embodiment in various forms of apparatus, I will describe one form thereof and it will be understood that various modifications may be made without departing from the scope of the invention.

Figure 1:
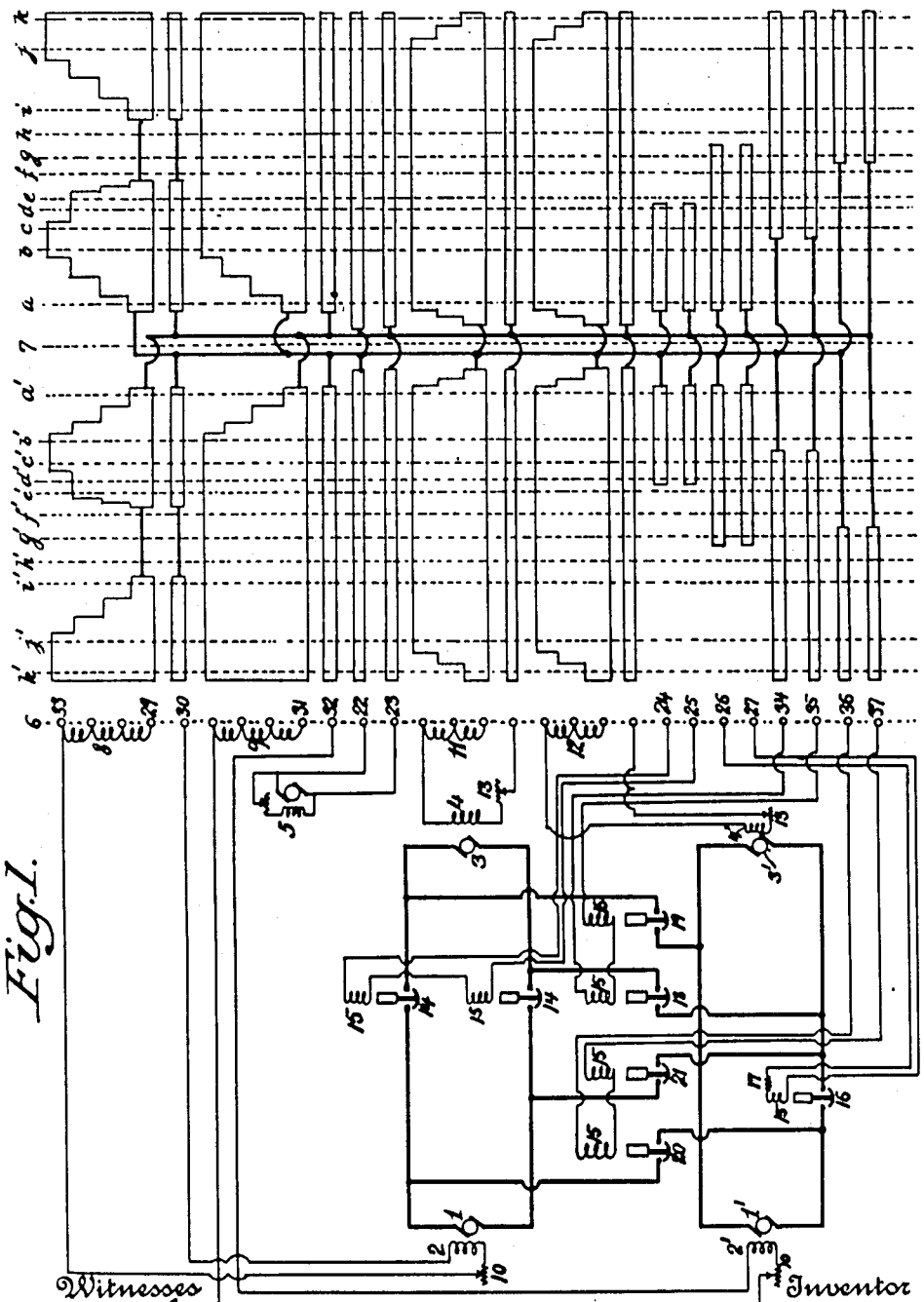
Figure 2:
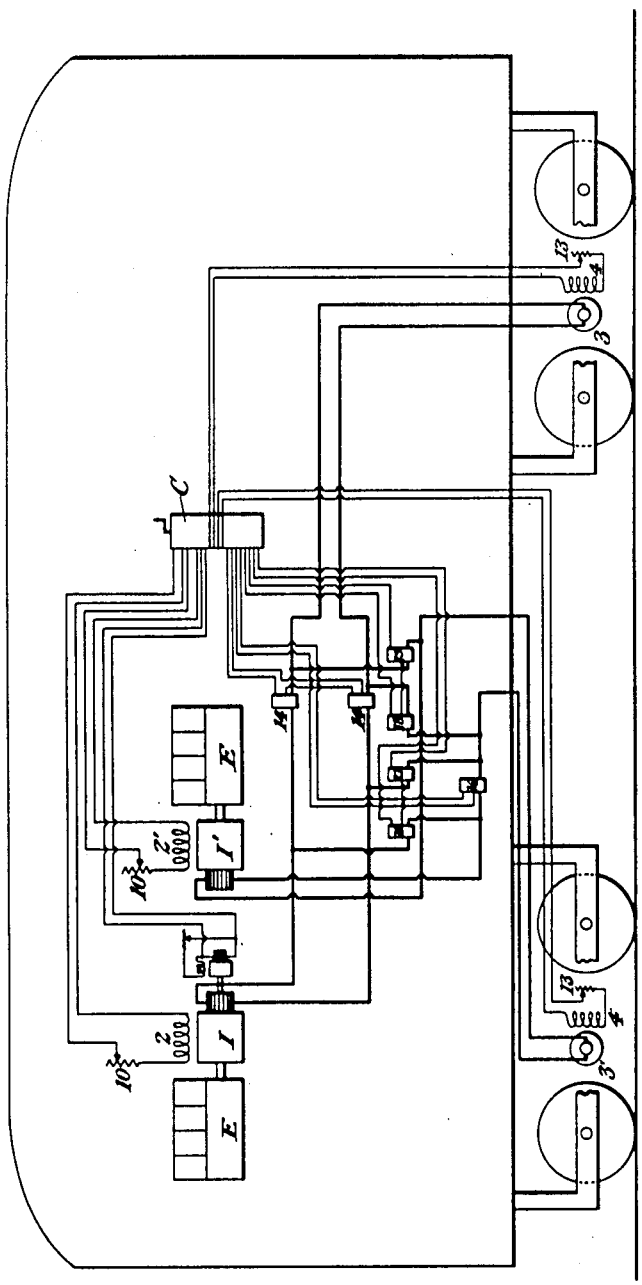

In the accompanying drawings Figure 1 is a diagram illustrating one form of my invention, showing a plurality of electric generators, a plurality of propelling motors, a development of one form of drum controller, and other auxiliary apparatus; and Fig. 2 is a diagram showing the apparatus applied to a vehicle.

Referring to Fig. 1, two direct current electric generators are shown having armatures 1, 1', and field windings 2, 2'. The motors are indicated as of the direct current type having armatures 3, 3' and field windings 4, 4', the motors being geared or otherwise related to the propelling wheels of the locomotive so as to act in common upon the load. All of the apparatus indicated in the figure is carried upon the locomotive or vehicle to be propelled, or if desired may be carried partly upon one unit and partly upon another unit comprising a train. The generators will be driven by any suitable means, such as by one or more gas engines E or other prime movers, or there may be a stationary source of electricity and current led upon the vehicle through suitable moving contacts and utilized to drive alternating or direct current motors located upon the vehicle, and which in turn drive the generator armatures 1, 1' preferably at substantially constant speed.

A self-exciting generator, or exciter, of the direct current type is indicated at 5, which supplies current to the field windings 2, 2' of the generators, and the field windings 4, 4' of the motors, and supplies, in this instance, the current for operating the electromagnetically controlled switches. This exciter may be mounted upon the shaft of either the generator 1 or generator 1', and thus driven by the same source of power as the generators, or the exciter may be driven by some auxiliary source preferably at substantially constant speed. The development of the master controller C of the drum type is indicated at the right of Fig. 1, the fixed contacts or fingers being indicated on the vertical line 6, and when the controller is in the off position, the contact fingers being on the line 7, the motors will be entirely disconnected from the generators and no power will be transmitted to them. When the controller drum is turned so that the fixed contacts successively occupy various positions to the right of the off position 7, the vehicle will be driven in one direction, and when the controller is turned so that the fixed contacts successively occupy the various positions to the left of the off position 7, the vehicle will be propelled in the reverse direction.

The resistances indicated at 8, connected between certain of the fixed contacts, are for the purpose of varying and controlling the current in the field winding 2 of the generator 1, and thereby vary and control the electromotive force generated thereby. The resistances indicated at 9, connected between certain of the fixed contacts, are adapted to be inserted or removed successively from the circuit of the field winding 2' of the other generator, and thereby control the electromotive force. In the circuit of the field windings 2 and 2' are indicated adjustable resistances 10 which may be varied by hand for securing further control of the current in the generator field windings, and correspondingly vary the electromotive force of the generators, or these resistances may be adjusted for securing any desired adjustment of resistance of the field winding circuits so as to secure their proper relation to each other or to the remaining portion of the apparatus.

At 11 are indicated resistances connected between certain of the fixed contacts and adapted to be inserted and withdrawn from the circuit of the field winding 4 of the motor 3, and similarly at 12 are indicated resistances connected between certain of the fixed contacts adapted to be inserted and withdrawn from the circuit of the field winding 4' of the propelling motor 3'. Adjustable resistances in the respective circuits of the field windings 4 and 4' are shown at 13, 13, which may be adjusted as desired for securing additional control of the field strength of the motors, or for securing proper relationship between the motors so that each will take its proper share of the load, and also for securing adjustment as required to the remaining portion of the apparatus.

Electromagnetically operated switches 14, 14, having coils 15, 15 for acting upon the iron cores of the switches and thereby raising them against gravity or other pressure, are shown for the purpose of closing a local circuit including the generator armature 1 and the motor armature 3. The coils 15, 15 are shown connected in series with each other, and the circuit thereof leads to a pair of fixed contacts so that the current in the coils 15, 15 will be controlled by the operation of the master controller. A switch 16 of similar type to the switches 14, and having a closing coil 15, is shown for the purpose of closing the local circuit of the generator armature 1' and motor armature 3', the controlling coil of switch 16 having leads connected to fixed contacts of the master controller, and having a resistance 17 in its circuit for limiting the current through the coil to the proper amount. At 18, 19 are indicated two similar electromagnetic switches having controlling coils 15 for connecting both motor armatures in parallel to the circuit of the generator armature 1', and also in parallel upon the circuit of the two generator armatures when they are connected in series with each other. The controlling coils of switches 18, 19 are connected in series with each other, and leads therefrom are connected to fixed contacts of the master controller. At 20, 21 are indicated similar electromagnetic switches having controlling coils 15, which switches are for the purpose of connecting the generator armatures 1, 1' in series with each other, as hereinafter explained. The coils of the switches 20, 21 are connected in series with each other, and have leads extending to fixed contacts of the master controller.

In considering the particular embodiment of my invention illustrated and described, it will be seen that the ampere capacity of each generator and motor should preferably be the same, but the volt capacity of each generator need only be one-half that of the volt capacity of each motor and the advantages of my invention in the form considered are thus obtained with a kilowatt capacity of each generator only one-half that of each motor.

Considering now the sequence of operation secured by movement of the master controller in the form illustrated, it will be seen that when the master controller drum is moved from off position, in which the fixed contacts are located on vertical lines 7, toward the initial starting position when the fixed contacts are upon line a, the fields of the two propelling motors are first energized from the exciter 5 by current passing from the exciter to fixed contact 22 to the conducting strip on the controller drum on the line of this contact, thence in one path to the conducting portion on the drum and out through fixed contacts connected to the resistance 11, thence through the motor field winding 4 to another fixed contact, then to a conducting strip on the controller drum to the conducting strip on the drum opposite fixed contact 23, and then back to the other terminal of the exciter 5. The field winding 4 of one motor will therefore be excited, and it will be seen by tracing the path of another circuit from the conducting strip opposite fixed contact 22 that the field winding 4' of the other motor will similarly be energized. It will be noted that initially the resistances 11 and 12 are connected in circuit but these are gradually cut out and the motor fields are fully excited when the drum is moved so that the same is in the starting position on line a. In this starting position the two switches 14, 14 and the switch 16 will be closed causing each generator armature to be connected in a local circuit with its respective motor armature. The closing of the switches 14 is secured by utilizing current from the exciter 5 and the closed circuit of these coils may be traced from the exciter to contact 22, thence to the conducting strip on the drum of the master controller, thence by a connection to a conducting strip opposite contact 24, thence through the coils 15 of the switches 14 back to contact 25 to a conducting strip on the controller drum, and then by a connection to another conducting strip on the drum to fixed contact 23, back to the exciter. The closing of the switch 16 is similarly secured by current from the exciter 5, the circuit being from contact 22 to a conducting strip on the drum, thence by a connection to a conducting strip opposite contact 26, and then through the coil 15 of the switch 16 back to contact 27 to a conducting strip on the drum, and then by a connection to a conducting strip opposite contact 23 back to the exciter. In this starting position the magnetic fields of the two generators will be low and cause the generator armature to deliver a low electromotive force to the motor armature for starting at a low speed. The low excitation of the generator fields is obtained by inserting the resistances 8 and 9 in the field circuits of the generators, and in this instance the current for exciting these fields is also derived from the exciter 5.

The path of the current through the field winding 2 from the exciter may be traced as follows: from one terminal of the exciter 5 to fixed contact 22 to a conducting strip on the controller drum, and thence by a connection to one of the upper segments on the drum, out through contact 29 through the resistance 8 and field winding 2 back to contact 30, thence to a conducting strip on the drum and by a connection to the strip opposite contact 23, and then to contact 23 back to the other terminal of the exciter. The circuit from the exciter through the field winding 2' of the other generator is from contact 22 through drum connections to contact 31, then through resistance 9 and field winding 2' back to contact 32, and then through controller drum connections to fixed contact 23 back to the exciter. The maximum ampere capacity of the generators and motors may be utilized in this position, or may be exceeded for a short length of time, if desired, giving large starting torque at low speed. By turning the controller successively through following positions on the drum, the sections of resistances 8 and 9 will be successively removed from the field circuits of the generators, thus gradually strengthening their fields and causing a gradually increased electromotive force to be generated by the generators and applied to the motors. This increase of electromotive force in the local power circuits will secure a gradual increase in speed without subjecting the vehicle or locomotive to abrupt movements, and in position $b$ all of the resistances 8 and 9 will be removed from the field circuit of the generators, and they will then generate their maximum electromotive force and secure corresponding speed of the vehicle. It will be seen that the resistance 8 is removed from circuit by following the current path from the exciter through contact 22 and through drum connections to the upper portion of an upper segment on the drum, out through contact 33 through the winding 2 to contact 30, and through drum connections to contact 23 back to the exciter. Similarly it will be seen that in this position $b$ the resistance 9 is removed from circuit while the connections of the motor fields and the coils of switches 14, 14 and 16 remain as previously explained, and any of the positions from $a$ to $b$ may be used with advantage as running positions.

The positions following position $b$ and to position $i$ are transitory positions and for the purpose of securing a new relationship of the generator and armature circuits for securing further increase of speed and without interruption of the supply of power to the vehicle. Movement to position $c$ causes the closing of the switches 18 and 19, the path of the current for exciting the coils of these switches being from the exciter to contact 22 through connections of the controller drum to contact 34, through the coils of the switches 18 and 19 back to contact 35, and then through contacts on the controller drum to contact 23 back to the exciter. Other connections of position $c$ remain the same as in position $b$, and it will be seen that the closing of the switches 18, 19 connects the motor armature 3 in parallel with the motor armature 3' upon the circuit of the generator armature 1'. In position $d$ a portion of the resistance 8 has been placed in the circuit of the field winding 2 so as to weaken the field strength of this generator to a sufficient degree to throw the load off of this generator and cause the generator armature 1' to assume all of the load. When the controller assumes position $e$, it will be noted that the circuit through contacts 24, 25 has been broken, which causes the coils of switches 14, 14 to be deënergized and these switches to be opened by gravity or other pressure. The generator armature 1 will therefore be disconnected from the circuit of its motor, and in succeeding positions of control, the resistance 8 will be gradually inserted in the field circuit of the generator 1, causing its field to be gradually weakened, and in position $f$ this field will be entirely deënergized by reason of the breaking of the field circuit at contacts 29 and 30. When the controller assumes position $g$ the switches 20, 21 will be closed due to the energization of their controlling coils, the path of the current through these coils being from exciter 5, to contact 22, through connections of the controller drum to contact 36, then through the coils of the switches 20, 21 back to contact 37, then through connections of the controller drum to contact 23 back to the exciter. Movement of the controller to position $h$ next causes the opening of the switch 16 by reason of the breaking of the circuit of its controlling coil at contacts 26 and 27. In this position, therefore, it will be seen that the generator armatures 1, 1' have been placed in series with each other, and that the motor armatures are connected in parallel to each other in the circuit, as will be evident from tracing the path of the circuit from the upper terminal of armature 1' in one path through switch 19, armature 3 and switch 18, and through another path through armature 3' to a connection which leads to switch 21, then through switch 21 and generator armature 1 to switch 20, and then by a connection to the lower terminal of the generator armature 1'. It will thus be seen that in this position $h$ the generator armature 1' is generating its full electromotive force and has in series therewith the generator armature 1, which is generating no electromotive force owing to the deënergization of its field. In position $i$ the field circuit of the generator 1 has been closed with all of the resistance 8 in series, and this generator will therefore generate a low electromotive force with the controller in this position. This generator armature 1 being in series with the generator armature 1', and the electromotive force of the generator 1 being in such direction as to be additive to that of the other, the electromotive force applied to the motors will be greater than that applied in position $h$ by the amount of electromotive force generated by armature 1. This condition, therefore, results in corresponding increase in speed of the motors. Further movement of the controller through the intermediate positions to position $j$ causes the sections of the resistance 8 to be successively short-circuited giving a corresponding gradual increase in electromotive force generated by the armature 1, and correspondingly increasing the electromotive force applied to the motors.

In position $j$ the generator armature 1 will force which, added to the full electromotive force of the generator armature 1', results in applying the maximum electromotive force to the motor armature giving corresponding high speed.

Still further increase in speed is obtained by passing to position $k$, which results in successively inserting sections of the resistances 11 and 12 in the field circuits of the motors and due to this weakening of the motor field strengths, the motors will gradually attain their maximum speed.

Movement of the controller backward from position $k$ to off position will cause the various connections above described to take place in reverse order, and result in gradually bringing the moving load element to rest. It will be noted that when the motor field circuits are finally broken, the arrangement of the contacts is such that the resistances 11 and 12 are inserted in the circuits and correspondingly reduce the current and minimize sparking at the final break. Also, whenever the field circuits of the generators are finally broken, the full resistances 8 and 9 are connected therein.

In order to reverse the direction of rotation of the motors, and thereby reverse the movement of the vehicle or locomotive, the direction of current in the field circuit of the motors may be reversed, or the direction of the current through the motor armatures, but I prefer to reverse the direction of current through the field windings of the generators, and thereby reverse the direction of electromotive force generated by the generator armatures which reverses the direction of the current applied to the motor armatures. This reversal of the generator fields may be secured by any suitable form of switch, but I prefer to arrange the master controller so that movement thereof in the reverse direction from off position will cause the reverse movement of the vehicle by causing the reversal of the generator fields. I also prefer to arrange the master controller so that reverse movement from off position will cause the same connections as already described.

Thus, referring to the drawings, it will be noted that when the controller is moved from off position so that the fixed contacts make engagement upon line $a'$, the connections are the same as made in position $a$, excepting that the direction of current through the generator field windings is the reverse of that obtained in position $a$, as may readily be seen by tracing the connections from the exciter 5 through the generator field windings. The subsequent connections obtained by the master controller by movement from position $a'$, to final position $k'$ are the same as already described with reference to positions $a$ to $k$, excepting that the direction of the current through the generator field windings is such as to maintain the reversed condition. Thus the controller is arranged to obtain all changes of speed up to the maximum for both the forward and reverse movement of the vehicle or locomotive.

It will be understood that the resistances 8, 9, 11 and 12 may be arranged to have any desired number of sections which will be successively inserted and removed from the field circuits, and also that various other modifications may be made to suit the requirements of the desired operating conditions.

Having thus described my invention, I declare that what I claim as new and desire to secure by Letters Patent, is—

1. The combination of a plurality of electric motors working upon a common load, a plurality of generative windings, means for connecting the generative windings to windings of said motors for supplying current to windings of said motors for securing certain speed, said generative windings supplying currents independently of each other to the motor windings, and for connecting the generative windings in series with each other to supply the motor windings for obtaining a higher speed.

2. The combination of a plurality of sources of electromotive force, a plurality of electric motors working upon a common load, and controlling means for connecting said sources in local independent circuits with said motors, for gradually increasing the electromotive force of said sources, for connecting said sources in series with each other for supplying energy to the motors, and for gradually increasing the joint electromotive force of said sources.

3. The combination of a plurality of sources of electromotive force, a plurality of electric motors working upon a common load, and a single controlling means for connecting said sources in local independent circuits with said motors, for gradually increasing the electromotive force of said sources, for connecting said sources in series with each other for supplying energy to the motors, and for gradually increasing the electromotive force of said sources.

4. The method of controlling the speed of a plurality of electric motors working upon a common load, which consists in supplying energy to corresponding windings of the motors from sources of electromotive force independently of each other, increasing the electromotive force of said sources, and connecting said sources in series with each other for increasing the electromotive force applied to the said motor windings.

5. The combination of a plurality of sources of electromotive force, a plurality of motors working upon a common load, automatic switches for connecting said sources to said motors in independent circuits respectively and for connecting said sources in series with each other for jointly supplying the motors, and a master controller for controlling said switches and for causing the electromotive force of said sources to be varied.

6. The combination of a plurality of sources of electromotive force, a plurality of motors working upon a common load, automatic switches for connecting said sources to said motors in independent circuits respectively and for connecting said sources in series with each other for jointly supplying the motors, and a master controller for controlling said switches, for causing the electromotive force of said sources to be varied, and for varying the field strengths of the motors.

7. The combination of a plurality of sources of electric energy for moving a common load, means for varying the division of the total energy between the sources and the relative circuit connections, said means comprising a plurality of automatically movable circuit controlling elements and a controller therefor.

8. A plurality of generators, a plurality of motors working upon a common load, each of said generators and of said motors having a field winding adapted to be separately excited, a common exciter for said field windings, and connections for causing each of said generators to supply energy to its respective motor independently of the other of said generators.

9. The combination of a plurality of sources of electromotive force, a plurality of motors working upon a common load, automatic switches for connecting said sources in series with each other for jointly supplying the motors, and a master controller for controlling said switches and for causing the electromotive force of said sources to be varied.

10. The combination of a plurality of sources of electromotive force, a plurality of motors working upon a common load, automatic switches for connecting said sources in series with each other for jointly supplying the motors, and a master controller for controlling said switches, for causing the electromotive force of said sources to be varied, and for varying the field strengths of the motors.

In testimony whereof I affix my signature, in presence of two witnesses.

H. WARD LEONARD.

Witnesses:
 BURKE STONE,
 GEORGE KAVANOGH.

It is hereby certified that in Letters Patent No. 1,043,778, granted November 5, 1912, upon the application of Harry Ward Leonard, of Bronxville, New York, for an improvement in "Electric Control Systems," an error appears in the printed specification requiring correction as follows: Page 4, line 45, after the word "will" insert the words *be producing its maximum electromotive;* and that the said Letters Patent should be read with this correction therein that the same may conform to the record of the case in the Patent Office.

Signed and sealed this 17th day of December, A. D., 1912.

[SEAL.]

C. C. BILLINGS,

*Acting Commissioner of Patents.*